(12) United States Patent
Niinuma

(10) Patent No.: US 7,329,969 B2
(45) Date of Patent: *Feb. 12, 2008

(54) ELECTRONIC DEVICE INCLUDING INTERFACE TERMINAL AND POWER SUPPLY CABLE CONNECTED THERETO

(75) Inventor: Susumu Niinuma, Saitama (JP)

(73) Assignee: TEAC Corporation, Musashino (JP)

( * ) Notice: Subject to any disclaimer, the term of this patent is extended or adjusted under 35 U.S.C. 154(b) by 439 days.

This patent is subject to a terminal disclaimer.

(21) Appl. No.: 10/961,836

(22) Filed: Oct. 8, 2004

(65) Prior Publication Data
US 2005/0141208 A1 Jun. 30, 2005

(30) Foreign Application Priority Data
Oct. 14, 2003 (JP) ............................. 2003-355067

(51) Int. Cl.
*H01H 83/14* (2006.01)
*H02H 3/24* (2006.01)
(52) U.S. Cl. ..................................... 307/130
(58) Field of Classification Search ................ 307/130
See application file for complete search history.

(56) References Cited

U.S. PATENT DOCUMENTS 5,956,158 A * 9/1999 Pinzarrone et al. ......... 358/474
7,043,646 B2 * 5/2006 Enami et al. ............... 713/300

FOREIGN PATENT DOCUMENTS

JP 2002-297269 10/2002

* cited by examiner

*Primary Examiner*—Michael Sherry
*Assistant Examiner*—Adi Amrany
(74) *Attorney, Agent, or Firm*—Christensen O'Connor Johnson Kindness PLLC

(57) ABSTRACT

It is difficult to increase consumption current of a bus-powered USB device. In order to solve this problem, a conversion cable for a DC connector and a USB connector is adopted in a USB device provided with a USB cable and a DC connector; a state in which power supply voltage is supplied to two sets of USB cables is detected; and a transistor power supply switch is turned on with a logical product thereof. An identification circuit which raises the potential of ground is incorporated in a USB conversion cable to be distinguished from an AC adaptor. When the AC adaptor is connected, the USB device operates as a self-powered USB device.

2 Claims, 4 Drawing Sheets

ELECTRONIC DEVICE INCLUDING INTERFACE TERMINAL AND POWER SUPPLY CABLE CONNECTED THERETO

BACKGROUND OF THE INVENTION

1. Field of the Invention

The present invention relates to an electronic device including an interface such as a USB, for example. Particularly, the present invention relates to an electric power supply section thereof.

2. Description of the Related Art

Hitherto, an electrical device including a USB (Universal Serial Bus) terminal (port), for example, such as a mouse, a keyboard, a CD-ROM, a CD-R/RW, an MO, and a DVD, has been known.

Using the USB interface, not only transmission and reception of data but also an electrical power supply from a host to a device is possible, and such device is called a bus-power device. In the bus-power device, a low power device having consumption current of maximum 100 mA and a high power device having consumption current of maximum 500 mA are defined. In addition, a device including its own power supply means such as an external power source is correspondingly called a self-power device.

As described above, since there is an upper limit of maximum 500 mA to a power supply cable of the USB interface, and since it is necessary to secure electric power independently on a device side by, for example, separately mounting an AC adaptor or a battery when a device whose consumption current exceeds 500 mA is used, there has been no other choice than providing an additional power supply circuit or an attachment.

However, to obtain a larger working space and a cost reduction, as well as high functionality of a device, it is further demanded, and desired particularly in recent years, to enable a variety of functions to be realized by receiving a supply of electric current that exceeds 500 mA without using an AC adaptor or an additional attachment.

In order to solve the above mentioned problem, the inventors of the present invention have filed a patent application for an invention relating to an electronic device capable of easily receiving electric current exceeding the maximum permissible current (500 mA) of one USB terminal using two or more USB interface signal cables. This is presented as a patent reference 1.

[Patent reference 1]

Japanese Laid-open Patent Application No. 2002-297269

In the above mentioned patent reference 1, the technical contents of a system are disclosed including firmware and a device driver in which a main unit of a USB device completely operates only when two sets of USB interfaces are connected. In detail, when a USB interface signal cable provided for a power supply is connected, the device acts as if a dummy USB device were connected on viewing from host equipment, such as a personal computer, for example. However, since such configuration forces a user to spend time and effort installing the device driver in the host equipment, usability deteriorates. There is also the case in which the installation of the software fails depending on a user, and it becomes impossible to provide a stable operation for the user. Moreover, the configuration of the device driver that is installed on the host equipment side and of the firmware that operates on the USB device side becomes complicated and therefore, not only development costs increase, but also bugs tend to be induced.

If simply a configuration of a second USB interface to which only a power supply cable is connected is provided in order to supplement a power supply of a conventional USB device, it is necessary to pay attention to a connection sequence of USB interface cables. In an apparatus configured in this manner, when a USB interface cable having a signal cable is connected first to a host apparatus, the device starts to operate since the signal cable is connected. Then, the USB device communicates with the host equipment in accordance with the USB protocol to inform the apparatus that a bus-power and high power device is connected, and finally it becomes possible to receive an electric current of 500 mA. However, since the power supply to the device is not yet sufficient, a shortage of a power supply capacity (electric current) with respect to the whole device occurs. As a result, operations of the device and of the host equipment become unstable. In other words, there is a possibility of causing a failure in the operation unless the two USB cables are connected simultaneously to the host equipment.

SUMMARY OF THE INVENTION

The present invention aims to solve such problem and to provide an electronic device that can easily receive electric current exceeding the maximum permissible current (500 mA) of one USB terminal in a stable state without considering connection timing or a connection sequence for two sets of USB cables.

Further, the present invention aims to provide a stably operating electronic device, in which an operation of the device is guaranteed only when two sets of USB cables are connected, and also, the operation of the device stops without failure when either one of the USB cables is disconnected.

Furthermore, the present invention also aims to provide a cable exclusively for power supply use that is connected to the above electronic device.

In order to solve the above described problems, as is clear from claim 1, an electronic device according to the present invention is a device including an interface for data transfer composed of a signal cable and a power supply cable in which maximum permissible current is set, having:

(a) a first interface terminal having a signal cable;

(b) a second interface terminal;

(c) a first switch which is connected to a power supply cable of the first interface terminal;

(d) a second switch which is connected between a power supply cable of the second interface terminal and the first switch;

(e) a power supply voltage detection means connected to either one of the power supply cable of the first interface terminal or the power supply cable of the second interface terminal so as to output a control signal in response to the fact that a voltage of the power supply cable has reached a predetermined voltage or more;

(f) a third switch to which ON/OFF-control is performed by an output terminal of the power supply voltage detection means, and also, which performs ON/OFF-control on the first and second switches using a voltage of one power supply cable which is not connected to the above power supply voltage detection means, out of the power supply cables of the first interface terminal and the power supply cable of the second interface terminal; and (g) a main unit connected to the output terminals of the above described first and second switches.

Further, the electronic device according to the present invention as described in claim 2, has:
(a) a first interface terminal having a signal cable;
(b) a second interface terminal;
(c) a first switch connected to a power supply cable of a positive electrode of the first interface terminal;
(d) a second switch connected between a power supply cable of a positive electrode of the second interface terminal and the first switch so that a cable connecting to the first switch becomes a power supply cable of the device;
(e) a power supply voltage detection means connected to the power supply cable of the positive electrode of the second interface terminal so as to output a control signal in response to the fact that a voltage of the power supply cable of the positive electrode has reached a predetermined voltage or more;
(f) a third switch to which ON/OFF-control is performed by an output terminal of the power supply voltage detection means, and also, which performs ON/OFF-control to the first and second switches using a voltage of the power supply cable of the first interface terminal;
(g) a fourth switch connected to the first switch, the third switch and a power supply cable of a negative electrode of the second interface terminal;
(h) a fifth switch connected to the second switch, the third switch and the power supply cable of the negative electrode of the second interface terminal; and
(i) a main unit connected to the signal cable of the first interface terminal and also to output terminals of the first and second switches.

Further, the electronic device according to the present invention as described in claims 3, 4, 5, 6 or 7, has:
(a) an interface terminal having a signal cable;
(b) an external power supply terminal;
(c) a first switch connected to a power supply cable of a positive electrode of the interface terminal;
(d) a second switch connected between a power supply cable of a positive electrode of the external power supply terminal and the first switch so that a cable connecting to the first switch becomes a power supply cable of the device;
(e) a first power supply voltage detection means connected to the power supply cable of the positive electrode of the interface terminal so as to output a control signal in response to the fact that a voltage of the power supply cable of the positive electrode has reached a first voltage;
(f) a second power supply voltage detection means connected to the power supply cable of positive electrode of the external power supply terminal so as to output a control signal in response to the fact that a voltage of the positive electrode connected has reached the first voltage;
(g) a control circuit connected to a power supply cable of a negative electrode of the above external power supply terminal, performing ON-operation on the first and second switches in response to the first power supply voltage detection means detecting that the power supply cable of the positive electrode of the interface terminal has reached the first voltage, the second power supply voltage detection means detecting that the power supply cable of the positive electrode of the external power supply terminal has reached the first voltage, and the power supply cable of the negative electrode of the external power supply terminal having reached close to the first voltage; and performing OFF-operation on the first and second switches in response to the first power supply voltage detection means detecting that the power supply cable of the positive electrode of the interface terminal having reached the first voltage, the second power supply voltage detection means detecting that the power supply cable of the positive electrode of the external power supply terminal having a voltage of the first voltage or more, and the power supply cable of the negative electrode of the external power supply terminal having not reached close to the above described first voltage;
(h) a third switch connected to the power supply cable of the positive electrode of the external power supply terminal;
(i) a third power supply voltage detection means connected to the power supply cable of the positive electrode of the external power supply terminal so as to output a control signal to perform ON-control on the third switch in response to the fact that a voltage of the positive electrode connected has reached a second voltage which exceeds the first voltage; and
(j) a main unit of a USB device connected to the signal cable of the interface terminal and to the first and second switches, in which a detection output signal cable of the third power supply voltage detection means is connected as a self-powered/bus-powered switching control signal of the main unit.

Further, as shown in claim 8, a power supply cable connected to the device of claims 3, 4, 5, 6 or 7 is desired to have: an interface terminal for data transfer and, a power supply terminal connected to the external power supply terminal of the device, and a connection recognition circuit connected between the power supply cable of the interface terminal for data transfer and the power supply terminal, in which a potential of a ground terminal of the power supply terminal is raised in response to the fact of being connected to host equipment and a predetermined voltage having been applied thereto.

According to the present invention, it is possible to receive in a stable state the consumption current that exceeds 500 mA from a host apparatus in a USB device that is connected to a portable host apparatus such as a notebook type personal computer even if a bus-powered mode is set. Moreover, since the device operates only after two sets of USB cable are connected, there is no need to consider a connection sequence or connection timing of cables, and therefore, a user friendly device can be provided.

According to aspects of claim 2 and thereafter of the present invention, since a power supply to a USB device is reliably cut off in a state where only one USB cable is connected, there is no need to worry about an erroneous operation of an apparatus and therefore, reliability is improved.

According to aspects of claim 3 and thereafter of the present invention, a USB device of the present invention is also possible to operate without a restriction of electric current as a self-powered device when an AC adaptor is connected.

According to the present invention, the design of an apparatus becomes considerably easy since dependence on a USB device is greatly reduced due to there being no need to apply an additional device driver to host equipment or the like in comparison to the conventional art that requires software control. At the same time, since there is no need for a user to install software and since an unstable element induced by software can be eliminated in the operation of the device and of the host equipment, the stability thereof can be improved.

Therefore, according to the present invention, the operational current capacity of a bus-powered device can be increased, reliably and safely at a low cost.

DESCRIPTION OF THE PREFERRED EMBODIMENTS

Figure 1:
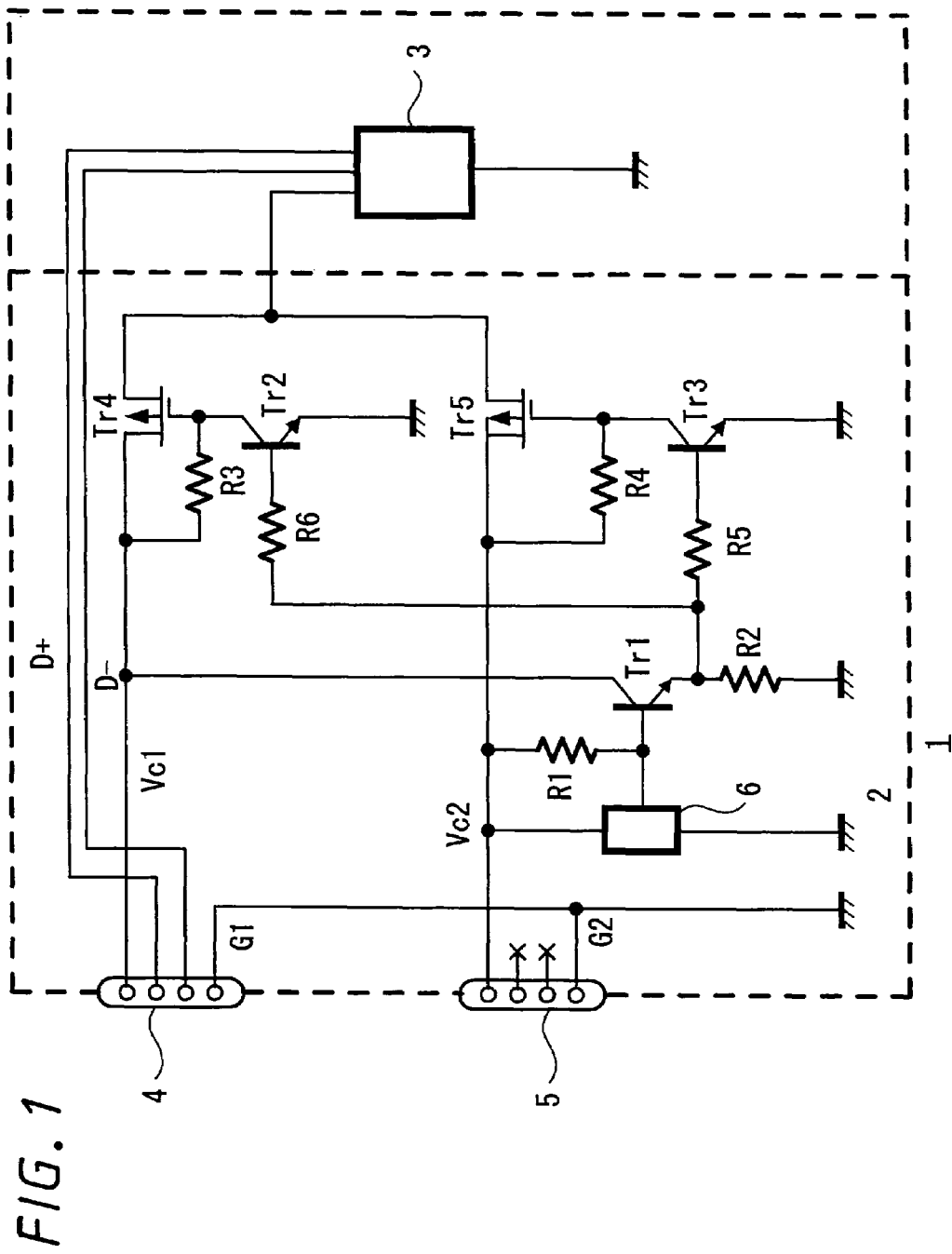
FIG. 1 is a circuit diagram showing a first embodiment of the present invention.

Fundamental art of the present invention is a configuration in which two sets of USB cables are connected, a state in which a power supply voltage is supplied from both of the cables is detected, and a transistor power supply switch is turned on with a logical product thereof. As a method of obtaining the logical product of voltages of two power supply cables, there is a method in which a voltage detection means is connected to each of the power supply cables to supply an output thereof to an AND-gate, and a method in which the voltage detection means is connected to one of the power supply cables and a transistor switch is provided to be controlled by the output of the above voltage detection means and to output a control signal with electric power obtained from the other power supply cable. In each case, an ON-operation is performed only after two sets of power supply cable are connected to a single piece of host equipment and a predetermined voltage is applied to each power supply cable.

Meanwhile, when a FET is in an ON-state, electric current of an inverse direction may flow between a drain and a source. This means that the FET maintains the ON-state once the FET is in the ON-state by dropping a gate voltage, unless the gate voltage is raised again. In other words, in order to realize the purpose of the present invention, it becomes necessary not only to perform an ON-control on a FET switch based on a logical product of two power supply cables but also to perform processing of an explicit OFF-control on the FET switch when either one of the power supply cables is disconnected.

Then, a ground side terminal of the USB cable for supplying power is separated from the ground inside a circuit, and is connected to a ground terminal of a logic circuit which controls a gate of the FET switch. With such configuration, when the USB cable for power supply is disconnected, the ground terminal becomes potentially floated and the logic circuit stops operating. As a result, the FET switch is turned off.

Further, the present invention also has a configuration to operate using an AC adaptor. Specifically, a jack for the AC adaptor is provided instead of the second USB cable, and a conversion cable for a USB plug and a plug used for the AC adaptor is used when a USB device alone is operated. An identification circuit is incorporated in the conversion cable to raise the ground potential.

When both of the first power supply cable and the second power supply cable show +5 volts and the potential of the ground terminal of the second power supply cable is also +5V, the ON-control is performed on the two FET switches. When the potential of the ground terminal of the second power supply cable is 0 volts, the OFF-control is performed on the two FET switches. Furthermore, when a voltage exceeding +5V is detected in the second power supply cable by a voltage detection circuit, the ON-control is performed on a third FET switch for supplying electric power to the device through a DC/DC converter.

The above described and other advantages of the present invention will be evident from the explanation of preferred embodiments of the present invention that are described with reference to accompanying drawings.

Embodiment 1

[Configuration of Device]

Hereinafter, embodiments of the present invention will be explained in detail by referring to the drawings. FIG. 1 is a power supply circuit of a USB device according to an embodiment of the present invention. A USB device 1 includes a power supply circuit 2 and a USB main unit 3. In the power supply circuit 2, a power supply cable Vc1 of a first USB cable 4 and a ground cable G1 are connected, and also, a power supply cable Vc2 of a second USB cable 5 and a ground cable G2 are connected to supply the following USB main unit 3 with power.

The USB main unit 3 constitutes known USB equipment such as a device having comparatively high consumption current, as well as being frequently used in combination with a notebook type personal computer or the like, for example, an optical disc apparatus such as a CD-RW drive or a DVD-RW drive. Although the USB main unit 3 is designed within a range where the consumption current does not exceed 1A, there is also a case in which it exceeds 500 ma depending on the state of usage, for example, at a time of recording on a disk or the like. Moreover, signal cables D+ and D− of the first USB cable 4 are directly connected to the USB main unit 3.

Tr4 of a FET constituting a voltage control switch, a resistance R3 for supplying a voltage to a gate of Tr4 and a collector of an NPN-type transistor switch Tr1 are connected to the power supply cable Vc1 of the first USB cable 4. Tr4 is a known p-channel enhancement type power MOSFET, and the state between the drain and source becomes ON by dropping the gate voltage to ground. A collector of an NPN-type transistor switch Tr2 constituting a NOT-gate of an open collector is connected to the gate of Tr4. In addition, an emitter of the transistor switch Tr2 is connected to ground.

Tr5 of a FET constituting a voltage control switch and a resistance R4 for supplying a voltage to a gate of Tr5 are connected to the power supply cable Vc2 of the second USB cable 5 similarly to the power supply cable Vc1 of the first USB cable 4, beside it, a resistance R1 for supplying a bias voltage to a voltage detection circuit 6 and to a base of the transistor switch Tr1 is also connected. Tr5 as well as Tr4 are also known p-channel enhancement type power MOSFET transistors, and the state between the drain and source becomes ON by dropping a gate voltage to ground. A collector of an NPN-type transistor switch Tr3 constituting a NOT-gate of an open collector is connected to the gate of Tr5 similarly to Tr4. In addition, an emitter of the transistor switch Tr3 is also connected to ground in the same manner as that of the transistor switch Tr2.

The voltage detection circuit 6 is provided for the purpose of detecting whether or not +5V of a specified power supply voltage of the USB is supplied to the power supply cable Vc2, and when detecting that the power supply cable Vc2 has a voltage of around +5V, an open collector type transistor switch which is incorporated and is not illustrated performs an OFF-operation. The base of the transistor switch Tr1 is connected to an output terminal of the voltage detection circuit 6, and a bias voltage is supplied from the power supply cable Vc2 through R1. The collector of the transistor Tr1 is connected to the power supply cable Vc1 of the first USB cable 4 as described above. An emitter of the transistor Tr1 is connected to the ground through a resistance R2, and, is also connected to the bases of the transistor switches Tr2 and Tr3 through bias resistances R5 and R6 to the respective bases. The ground cable G1 of the first USB cable 4 and the ground cable G2 of the second USB cable 5 are respectively connected to ground.

Hereupon, the USB device 1 shown in FIG. 1 is an apparatus that has been made assuming that the apparatus is typically carried and moved by a user.

The USB device 1 of FIG. 1 is connected to a host apparatus which is not illustrated. An apparatus such as a notebook type personal computer or the like is assumed to be a typical host apparatus. In other words, it is assumed that the first USB cable 4 and the second USB cable 5 are to be respectively connected to two USB connectors that are provided for a single host apparatus. Note that the condition with respect to the host apparatus is common in a second embodiment, a third embodiment and a modified example that are described later on.

[Operation]

In a state where the first USB cable 4 is connected to host equipment not illustrated and also the second USB cable 5 is not connected thereto, +5V is applied to the power supply cable Vc1, however +5V is not applied to the power supply cable Vc2. Accordingly, since the voltage detection circuit 6 does not operate and the base potential of the transistor switch Tr1 does not rise, Tr1 is in an OFF state. Tr2 and Tr3 that are connected to the emitter of Tr1 are also OFF and the OFF-state is maintained since the gate potentials of Tr4 and Tr5 do not fall either. In this state, when the second USB cable 5 is connected to the host equipment, +5V is applied to the power supply cable Vc2.

When the voltage detection circuit 6 detects that +5V is applied to the power supply cable Vc2, the open collector type transistor switch (not illustrated) that is incorporated in the voltage detection circuit 6 enters an OFF-operation and thereby the base potential of the transistor switch Tr1 rises to enter an ON-operation. With the ON-operation of Tr1, the emitter potential of Tr1 rises to +5V which is the voltage of the power supply cable Vc1 and which is applied to the collector, and Tr2 and Tr3 also enter ON-operations in response thereto. With the ON-operation of Tr2, the gate potential of Tr4 falls to the ground to have Tr4 enter an ON-operation. With the ON-operation of Tr3, the gate potential of Tr5 falls to ground to have Tr5 enter an ON-operation. As a result, electric power of the power supply cables Vc1 and Vc2 is supplied to the USB main unit 3 through Tr4 and Tr5.

In a state where the first USB cable 4 is not connected to the host equipment and also the second USB cable 5 is connected to the host equipment, +5V is not applied to the power supply cable Vc1, however +5V is applied to the power supply cable Vc2. Accordingly, the voltage detection circuit 6 operates and the base potential of the transistor switch Tr1 rises to have Tr1 enter the ON-operation. However, since the voltage is not applied to the power supply cable Vc1, a potential difference is not generated between the emitter of the transistor switch Tr1 and the resistance R2. Accordingly, the following transistor switches Tr2 and Tr3 are also OFF, and the OFF-state is maintained since the gate potentials of Tr4 and Tr5 do not fall either.

In this state, when the first USB cable 4 is connected to the host equipment, +5V is applied to the power supply cable Vc1. With applying +5V to the power supply cable Vc1, a potential difference is generated between the emitter of the transistor switch Tr1 and the resistance R2 in which the potential difference has not been generated since the voltage has not been applied though having been already in the ON-state. In other words, the emitter potential of Tr1 rises to +5V which is the voltage of the power supply cable Vc1 and which is applied to the collector by the ON-operation of Tr1 in the same manner as described above, and Tr2 and Tr3 also enter ON-operations in response thereto. The gate potential of Tr4 falls to ground by the ON-operation of Tr2 to have Tr4 enter the ON-operation. The gate potential of Tr5 falls to ground by the ON-operation of Tr3 to have Tr5 enter the ON-operation. As a result, the electric power of the power supply cables Vc1 and Vc2 is supplied to the USB main unit 3 through Tr4 and Tr5.

As described above regarding the circuit in FIG. 1, the power is supplied to the USB main unit 3 only after the first USB cable 4 and the second USB cable 5 have been respectively connected to the host equipment. However there is a problem in the circuit of FIG. 1. When a FET is in an ON-state, electric current of not only a forward direction but also an inverse direction may flow between the drain and source. Specifically, when the second USB cable 5 is disconnected from the host equipment in a state where the first USB cable 4 and the second USB cable 5 are respectively connected to the host equipment and the power is supplied to the USB main unit 3, the electric current flows inversely in Tr5 from the power supply cable Vc1 of the first USB cable 4 to supply the voltage of Vc1 to the voltage detection circuit 6 and to the bias resistance R1.

Accordingly, since the OFF-state of the voltage detection circuit 6 and the ON-state of Tr1 are maintained, the voltage of the power supply cable Vc1 of the first USB cable 4 is being supplied to the USB main unit 3, so that the USB main unit 3 is not turned off even when the second USB cable 5 is plugged off from the host equipment. As a result, there arises a possibility that the operation of the USB main unit 3 becomes unstable since power continues to be supplied to the USB main unit 3 in a state where a current capacity is insufficient. Note that when the first USB cable 4 is disconnected first, an inverse flow phenomenon of the voltage also occurs to maintain the ON-state of Tr4 and Tr5 as in the above described case, however since a connection of the signal cables D+ and D− between the USB main unit 3 and the host equipment, which is in communication with the host equipment, is cut off and thereby, the operation of the USB main unit 3 practically stops, which causes no major problem.

Then, an embodiment to solve the above problem, in which a power supply to an apparatus is cut off without failure when either one of the USB cables is disconnected from host equipment is explained.

Embodiment 2

[Configuration of Apparatus]

Figure 2:
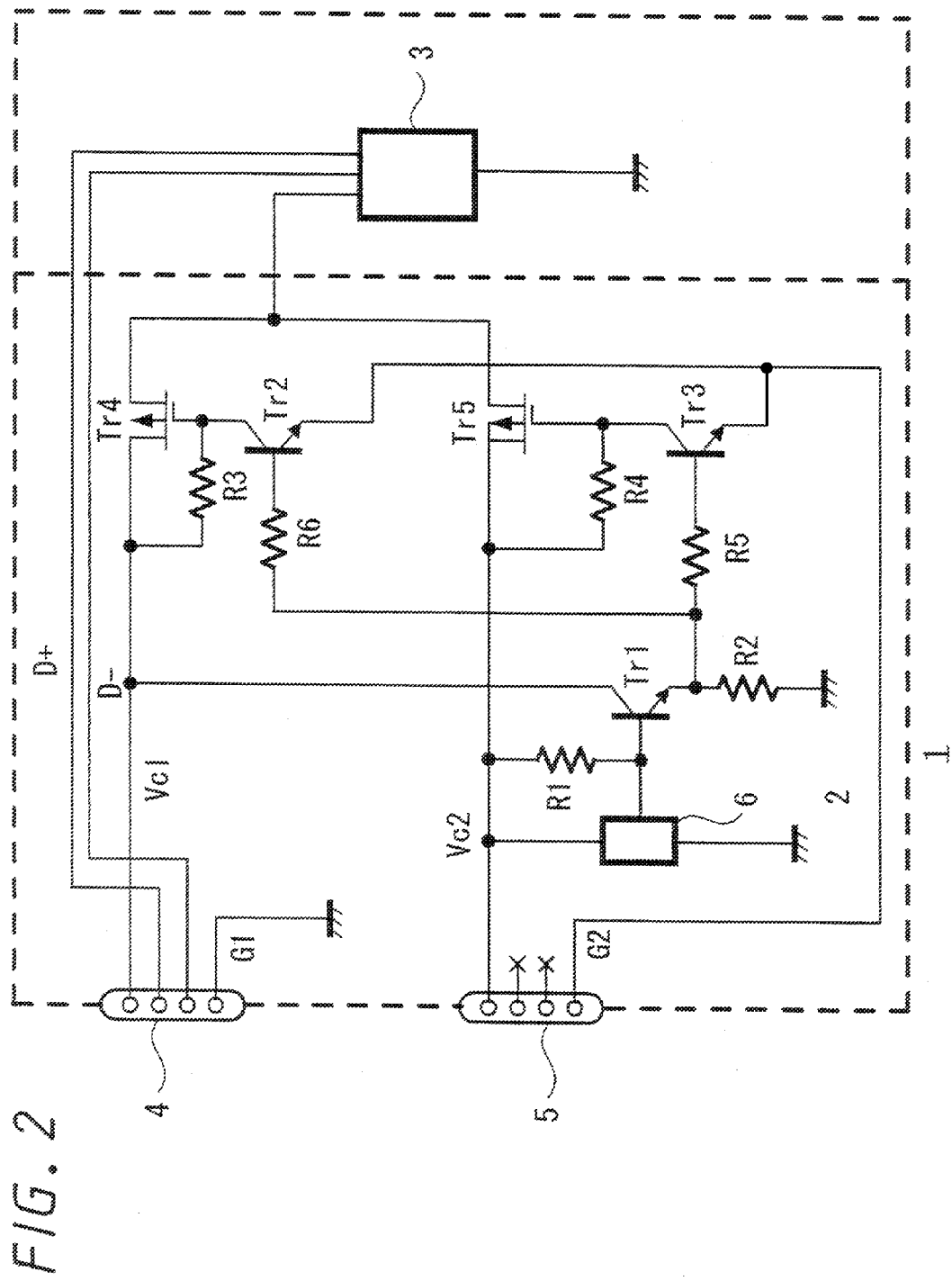
FIG. 2 is a circuit diagram showing a second embodiment of the present invention.

FIG. 2 is a power supply circuit of a USB device according to an embodiment of the present invention. An explanation regarding the same parts and functions as those in FIG. 1 is omitted and only the different parts from FIG.

1 will be explained. The ground cable G2 of the second USB cable is not connected to ground but is connected to the emitters of the transistor switches tr2 and Tr3. When the second USB cable 5 is connected to host equipment, the emitters of the transistor switches Tr2 and Tr3 are connected to the ground cable G1 of the first USB cable 4 through the ground of the host equipment.

[Operation]

In a state where the first USB cable 4 is connected to the host equipment and the second USB cable 5 is not connected to the host equipment, +5V is applied to the power supply cable Vc1, however +5V is not applied to the power supply cable Vc2. Accordingly, Tr1 is OFF since the voltage detection circuit 6 does not operate and the base potential of the transistor switch Tr1 does not rise either. The OFF-state is maintained since Tr2 and Tr3 connected to the emitter of Tr1 are also OFF and the gate potentials of Tr4 and Tr5 do not fall either. In this state, when the second USB cable 5 is connected to the host equipment, +5V is applied to the power supply cable Vc2, and also, the ground cable G2 is connected to the ground of the host equipment and is connected to the ground cable G1 of the first USB cable 4 through the ground of the host equipment to be grounded. When the voltage detection circuit 6 detects that +5V is applied to the power supply cable Vc2, the open collector type transistor switch (not illustrated) that is incorporated in the voltage detection circuit 6 enters an OFF-operation and thereby, the base potential of the transistor switch Tr1 rises to enter an ON-operation. With the ON-operation of Tr1, the emitter potential of Tr1 rises to +5V that is the voltage of the power supply cable Vc1 and that is being applied to the collector. Since the respective emitters of Tr2 and Tr3 are connected to the ground cable G1 through the ground cable G2, the base current flows in response thereto so that the both can enter ON-operation. With the ON-operation of Tr2, the gate potential of Tr4 falls to ground to have Tr4 enter an ON-operation. With the ON-operation of Tr3, the gate potential of Tr5 falls to ground to have Tr5 enter an ON-operation. As a result, the electric power of the power supply cables Vc1 and the Vc2 is supplied to the USB main unit 3 through Tr4 and Tr5.

In a state where the first USB cable 4 is not connected to host equipment and the second USB cable 5 is connected to the host equipment, +5V is not applied to the power supply cable Vc1, however +5V is applied to the power supply cable Vc2. However, the ground cable G2 is not connected to the ground of the USB device 1. Accordingly, the voltage detection circuit 6 does not enter an OFF-operation and thereby, the ground and the base of the transistor switch Tr1 are connected through the voltage detection circuit 6. Then, the potential between the base and emitter of the transistor switch Tr1 becomes equal so that Tr1 does not turn on and the following transistor switches Tr2 and Tr3 can not enter ON-operation since the base current does not flow either. Accordingly, the OFF-state is maintained since the gate potentials of Tr4 and Tr5 do not fall either.

In this state, when the first USB cable 4 is connected to the host equipment, +5V is applied to the power supply cable Vc1, and also, the ground cable G1 is connected to the host equipment. Then, the ground cable G2 is connected to the ground cable G1 through the ground of the host equipment so that the ground cable G1 and the ground cable G2 become a common ground potential (0V). Accordingly, all circuit elements that are connected to the power supply cables Vc1 and Vc2 function efficiently.

First, the voltage detection circuit 6 detects the voltage of the power supply cable Vc2 to enter an OFF-operation. The base current is supplied to the base of the transistor switch Tr1 from the power supply cable Vc2 through the resistance R1 to enter an ON-operation. Then, the power supply cable Vc1 is connected to the resistances R5 and R6 through the collector and emitter of Tr1. Then, since the ground cable G1 is connected to the host equipment, the respective emitters of Tr2 and Tr3 are connected to ground to enter ON-operation. With the ON-operation of Tr2, the gate potential of Tr4 falls to ground to have Tr4 enter an ON-operation. With the ON-operation of Tr3, the gate potential of Tr5 falls to ground to have Tr5 enter an ON-operation. As a result, the electric power of the power supply cables Vc1 and Vc2 is supplied to the USB main unit 3 through Tr4 and Tr5.

According to the circuit of this embodiment shown in FIG. 2, the problem at the time of cutting off the power that has existed in the circuit of FIG. 1 can be solved. The operation thereof is explained below.

In a state where the first USB cable 4 and the second USB cable 5 are respectively connected to host equipment so that power is supplied to the USB main unit 3 inside the USB device 1, when the first USB cable 4 is disconnected from the host equipment, the voltage of +5V which has been supplied to the power supply cable Vc1 is stopped, and also, the ground cable G1 is disconnected. Since the ground cable G1 is disconnected from the host equipment, the ground cable G2 is disconnected from the ground inside the USB device 1. Accordingly, it becomes impossible for the voltage detection circuit 6 to detect the voltage of the power supply cable Vc2. In other words, when the first USB cable 4 is disconnected, the second USB cable 5 is also practically disconnected. Accordingly, the voltage detection circuit 6 drops the base potential of Tr1 to ground, between the collector and emitter Tr1 is disconnected, the emitter of Tr1 falls to ground, the base current of Tr2 and Tr3 does not flow either, and Tr4 and Tr5 are also turned off. Therefore, the power supply to the USB main unit 3 is cut off.

In a state where the first USB cable 4 and the second USB cable 5 are respectively connected to host equipment so that the power is supplied to the USB main unit 3 inside the USB device 1, when the second USB cable 5 is disconnected from the host equipment, the voltage of +5V that has been supplied to the power supply cable Vc2 is stopped, and also, the ground cable G2 is disconnected. Then, the emitters of Tr2 and Tr3 are disconnected from the ground inside the USB device 1 and the base current stops flowing to be turned off respectively. Tr4 and Tr5 are also turned off in response to the fact that Tr2 and Tr3 are turned off. Accordingly, since inverse current that flows from the power supply cable Vc1 through Tr4 and Tr5 is prevented, the power supply to the USB main unit 3 is cut off. In other words, according to this embodiment when either one of the first USB cable 4 or the second USB cable 5 is disconnected from the host equipment, the power supply to the USB main unit 3 is cut off without failing.

Embodiment 3

[Configuration of Apparatus]

Figure 3:
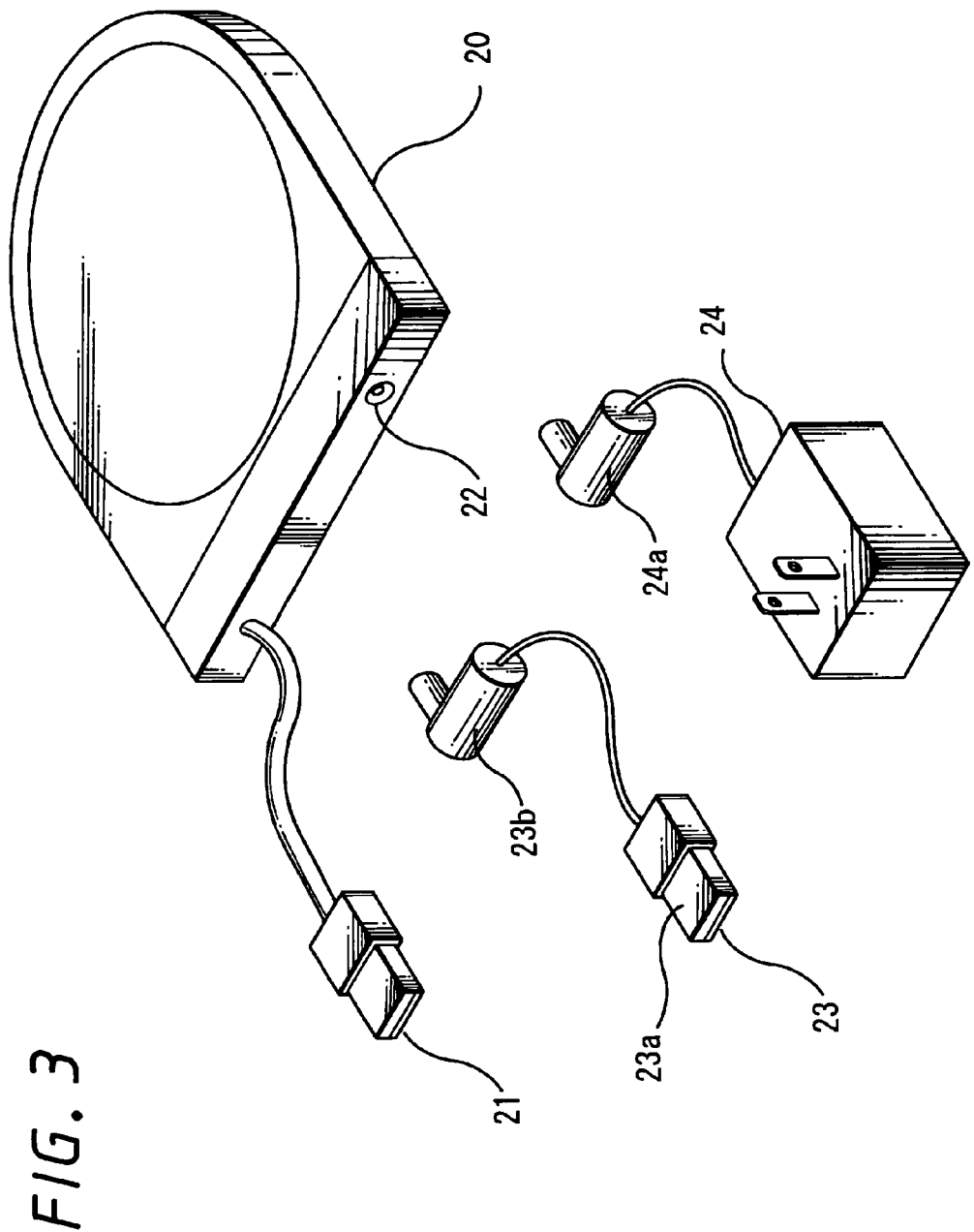
FIG. 3 is a schematic perspective view showing an appearance of an apparatus according to a third embodiment of the present invention.
Figure 4:
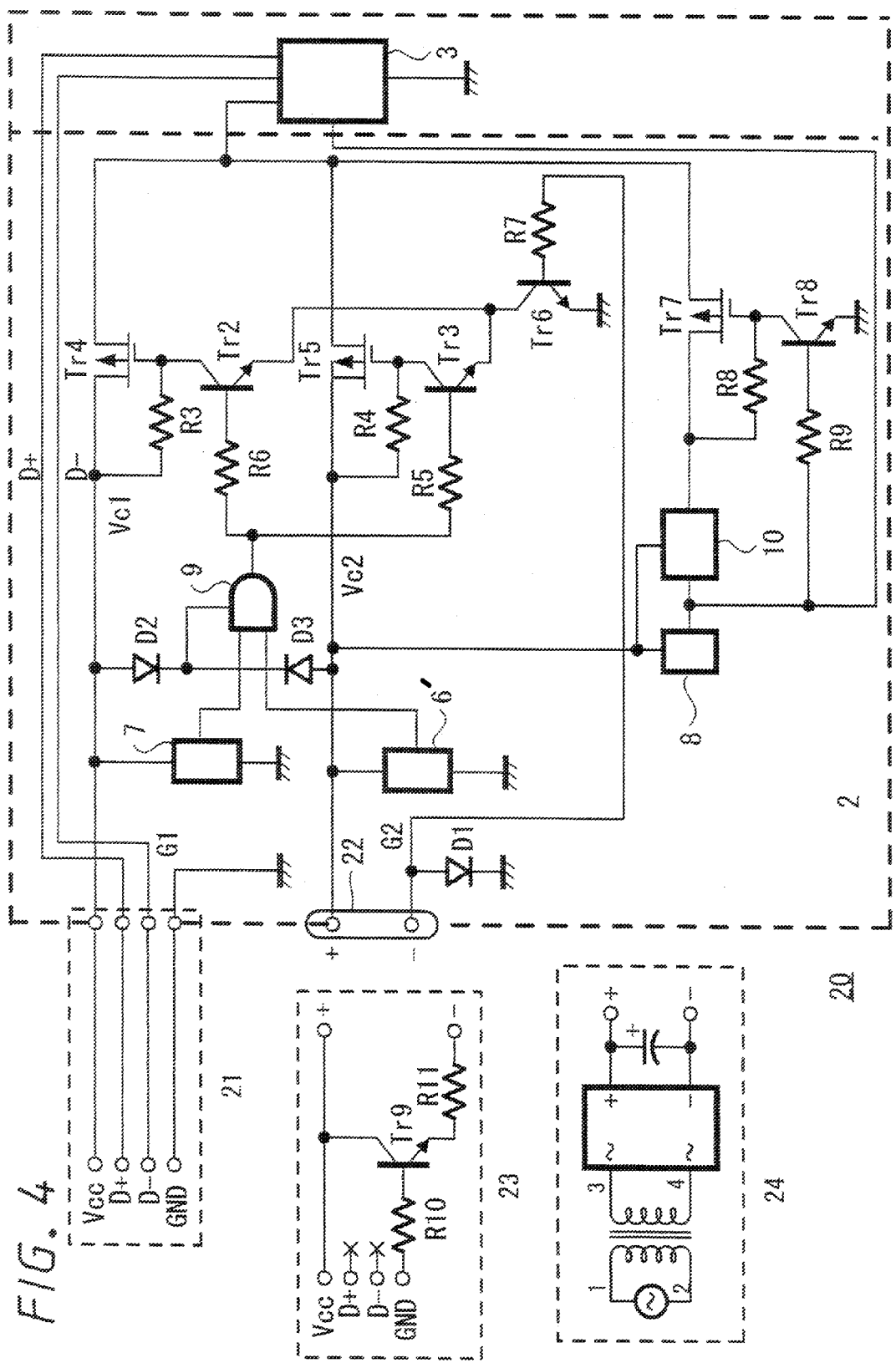
FIG. 4 is a circuit diagram showing the third embodiment of the present invention.

FIG. 3 is an overall view of a USB device according to an embodiment of the present invention, and FIG. 4 is a power supply circuit of the USB device according to an embodiment of the present invention. A DVD-RW apparatus 20 is provided with a USB cable 21 and a DC jack 22. The DC jack 22 is a known jack for a direct-current power supply to which an AC adaptor 24 and a USB conversion cable 23 are selectively connected. The AC adaptor 24 is a known AC-DC converter including a transformer, a diode rectifier, a capacitor and a coil, and outputs a voltage higher than bus power through a DC plug 24a. For example, a voltage of +9V is output. The USB conversion cable 23 is a conversion cable to connect a power supply cable of a USB interface to the DC jack 22 of the DVD-RW apparatus 20 and includes a USB plug 23a and a DC plug 23b when viewing the external appearance. A PNP transistor Tr9 for switching, a resistance R10 and a resistance R11 are provided inside as a conversion cable detection circuit. The conversion cable detection circuit inside the USB conversion cable 23 is provided for the purpose of outputting +5V to a negative terminal of the DC jack 22 of the DVD-RW apparatus 20 when host equipment and the DVD-RW apparatus 20 are connected using the USB conversion cable 23. When the USB conversion cable 23 is connected to the host equipment, base current flows between a base and emitter of the transistor Tr9 through the bias resistance R10 and thereby, between the collector and emitter the transistor Tr9 becomes conductive so that +5V is obtained at the negative terminal of the DC plug.

Hereinafter, only the differences from the above mentioned FIGS. 1 and 2 are explained in FIG. 4. A first voltage detection circuit 7 to detect +5V is connected to the power supply cable Vc1 of the USB cable 21. A second voltage detection circuit 6' to detect +5V is connected to the power supply cable Vc2 of the DC jack 22. In order to prevent damage to the host equipment caused by inverse current at a time when a power source is connected, the first voltage detection circuit 7 and the second voltage detection circuit 6' are designed to respectively detect only a voltage within a narrow range. For example, the range is around +5 plus/minus 0.3V. Detected outputs of the first voltage detection circuit 7 and the second voltage detection circuit 6' are supplied to an AND-gate 9. An output of the AND-gate 9 is supplied to the transistor switches Tr2 and Tr3 respectively through the base resistances R6 and R5. Inverse current prevention diodes D2 and D3 are connected respectively to the power supply cable Vc1 and the power supply cable Vc2 to be a power source of the AND-gate 9. A third voltage detection circuit 8 to detect +6V or more is further connected to the power supply cable Vc2 of the DC jack 22. A detected output of the third voltage detection circuit 8 is supplied to a control terminal of a following DC/DC converter 10. The DC/DC converter 10 is a known voltage-drop DC/DC converter of a PWM control and maintains an output voltage at +5V. Moreover, the detected output of the third voltage detection circuit 8 is also supplied to a transistor switch Tr8 for ON/OFF-control of a FET switch Tr7 through a base resistance R9. Furthermore, the detected output of the third voltage detection circuit 8 is supplied to a self-power/bus-power switching control signal input terminal of the USB main unit 3. A resistance R8 which supplies a bias voltage is connected between a source and a gate of Tr7.

[Operation]

In a state where the USB cable 21 is connected to host equipment and nothing is connected to the DC jack 22, +5V has been applied to the power supply cable Vc1, however, no voltage is applied to the power supply cable Vc2. Therefore, since the voltage detection circuit 7 operates but the voltage detection circuit 6 does not operate, the output of the AND-gate 9 is 0 volts. The base potentials of the transistor switches Tr2 and Tr3 that are disposed behind the AND-gate 9 do not rise either to be turned off. Accordingly, the OFF-state is maintained since the gate potentials of Tr4 and Tr5 do not fall either.

In this state, when the USB conversion cable 23 is connected to the host equipment and to the DC jack 22, +5V is applied to the power supply cable Vc2, and also, the base current flows through the bias resistance R10 between a base and emitter of the PNP transistor Tr9 for switching constituting the conversion cable detection circuit, and thereby, between the collector and emitter the transistor Tr9 becomes conductive so that a positive voltage is obtained in the negative terminal of the DC plug through the resistance R11. Then, base current flows in a base of a transistor Tr6 through a resistance R7 so that between the collector and emitter Tr6 is turned on.

On the other hand, when +5V is applied to the power supply cable Vc2, the second voltage detection circuit 6' outputs H and together with the output H from the first voltage detection circuit 7, those outputs are input into the AND-gate 9 so that the AND-gate 9 outputs H. The base potentials of the transistor switches Tr2 and Tr3 that are disposed behind the AND-gate 9 rise to be turned on. Since the emitters of Tr2 and Tr3 are connected to the collector of Tr6, they fall to ground potential when Tr6 is turned on. Due to the above, the collector potentials of Tr2 and Tr3 fall close to ground potential and the gate potentials of Tr4 and Tr5 fall close to the ground potential to be turned on.

Accordingly, the power supply voltage of the power supply cables Vc1 and Vc2 is supplied to the USB main unit 3. Note that since the output of the third voltage detection circuit 8 is kept to be 0 volts at this time and an L-output (pseudo-logic) indicating the bus-power is input into the USB main unit 3 as a control signal, the USB main unit 3 recognizes itself to be a bus-power device; outputs information thereof when a communication is performed with the host equipment; and also, operates within a range in which the maximum consumption current does not exceed 1A. Since the USB main unit 3 is a DVD-RW drive in this embodiment, such a method as restricting a maximum rotational speed of a spindle motor, making a seeking speed of a sled slower, prohibiting a recording function on a disc or the like is selected.

In a state where the USB conversion cable 23 is connected to host equipment and the USB cable 21 is not connected to the host equipment, only a power supply cable +Vcc of a USB interface of the host equipment is connected, however a ground GND is not connected to the USB conversion cable 23. Therefore, a power supply circuit 2 does not operate since power is not supplied to the DVD-RW apparatus 20.

In a state where the USB cable 21 is not connected to the host equipment, when the AC adaptor 24 is connected to the DC jack 22, +9V is applied to the power supply cable Vc2 and to the ground cable G2 through the diode D1. Since a slight voltage by a voltage drop of the diode D1 is applied to the transistor Tr6 between the base and emitter thereof in an inverse direction to a base current flowing direction, the base current does not flow and between the collector and emitter Tr6 remains turned off.

In addition, since the second voltage detection circuit 6' detects a voltage exceeding 5V plus/minus 0.3V when +9V is applied to the power supply cable Vc2, L is output. Therefore, the output of the AND-gate 9 becomes L irrespective of a result of the voltage detection of the first voltage detection circuit 7 to have Tr2 and Tr3 maintain the OFF-state, and the gate potentials of Tr4 and Tr5 do not fall either so that the OFF-state is maintained.

On the other hand, the third voltage detection circuit 8 detects that +6V or more has been applied to the power supply cable Vc2 and outputs H. Accordingly, the DC/DC converter 10 enters an ON-operation to make the voltage of +9V which has been applied to the power supply cable drop to +5V to be output. The FET switch Tr7 is connected to an output side of the DC/DC converter 10. On the other hand, the H-output of the third voltage detection circuit 8 is also received by a base of the transistor switch Tr8 through the resistance R9, and between the collector and emitter Tr8 becomes an ON-state. Accordingly, the gate potential of Tr7 falls close to ground, so that Tr7 is turned on, and only the electric power of the AC adaptor 24 which has been dropped by the DC/DC converter 10 is supplied to the USB main unit 3.

Further, since the H-output of the voltage detection circuit 8 is input into the self-power/bus-power switching control signal input terminal of the USB main unit 3 as a control signal indicating the self-power, the USB main unit 3 recognizes itself to be a self-power device.

As mentioned above, when the AC adaptor 24 is connected and +9V is detected, the third voltage detection circuit 8 controls the DC/DC converter 10 as well as the transistor switches Tr7 and Tr8 regardless of whether the USB cable 21 is connected to the host equipment or not. As a result, the electric power is supplied to the USB main unit 3.

When the AC adaptor 24 is connected to the DC jack 22 and +9V is supplied, the USB main unit 3 recognizes itself to be the self-power device since the electric power is supplied immediately to the USB main unit 3 and also the control signal indicating the self-power is input to the self-power/bus-power switching control signal input terminal of the USB main unit 3. The USB main unit 3 shifts to a standby state through an initialization operation which is performed immediately after the start of the power supply until the USB cable 21 is connected to host equipment. When the USB main unit 3 is the DVD-RW drive, for example, the initialization operation represents an initializing operation of the USB main unit 3, a detecting operation of a disc and the like. The standby state represents stopping a rotation of a spindle motor, stopping servo systems of various pickups, stopping power supply to a recording and reproducing circuit and the like, for example.

Then, when the USB cable 21 is connected to host equipment, information that it is a self-power device is output at the time of performing communication with the host equipment, and also, an operation is performed in a state where maximum consumption current may exceed 1A. For example, when the USB main unit 3 is the DVD-RW drive, such operations as removing a restriction to a maximum rotation speed of a spindle motor to operate the drive at the highest possible rotation speed, allowing a recording function to a disc and the like are performed.

As described above, since the ground of the USB device is connected to the negative terminal of the AC adaptor 24 through the diode D1, an operation as a circuit is possible not only at the time of the connection using the USB conversion cable 23 but also at the time of the connection using the AC adaptor 24. Specifically, the diode D1 is provided for the purpose of preventing inverse current in a cable that is a positive voltage detection cable, and also, which can become the ground.

In other words, according to this embodiment, in the state where the USB cable 21 and the USB conversion cable 23 are connected to the host equipment, the operation is performed as the bus-powered device within the range in which the consumption current does not exceed 1A, and also in the state where the AC adaptor 24 is connected, the operation is performed as the self-powered device under the state where there is no restriction to the electric current.

In the state of the bus-powered device, the operation of the DVD-RW apparatus 20 that is the USB device stops immediately when either one of the USB cable 21 or the USB conversion cable 23 is disconnected from the host equipment. In the state of the self-powered device, the operation of the DVD-RW apparatus 20 that is the USB device continues while the AC adaptor 24 is connected, and the operation stops immediately when the AC adaptor 24 is disconnected.

[Application Example]

The present invention is not limited to the above described embodiments and various applications thereof are possible. Those are mentioned hereunder.

(1) Instead of the combination of the voltage detection circuit 6 and the transistor switch Tr1 that is used in embodiments 1 and 2, the combination of the first voltage detection circuit 7, the second voltage detection circuit 6' and the AND-gate 9 that is used in embodiment 3 can be applied to embodiments 1 and 2.

(2) Instead of the combination of the first voltage detection circuit 7, the second voltage detection circuit 6' and the AND-gate 9 that is used in embodiment 3, the combination of the voltage detection circuit 6 and the transistor switch Tr1 that is used in embodiments 1 and 2 can be applied to embodiment 3.

(3) In embodiment 3, the DC/DC converter 10 can be omitted if the USB main unit 3 is designed to have an incorporated DC/DC converter and is able to operate over a wide range of voltages.

(4) Also in embodiment 3, it is possible to omit the third voltage detection circuit 8 and instead, AND is taken with respect to an output of the AND-gate 9 and an inverting input of the ground G2 of the DC jack 22 to realize the bus-powered/self-powered switching. In this case, since the device becomes operational only after the USB cable 21 is connected, and since the USB main unit 3 maintains the whole device in an OFF-state until the USB cable 21 is connected to host equipment instead of entering standby operation performed by the AC adaptor 24, there is an advantage in power consumption.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

The invention claimed is:

1. An electronic device including an interface for data transfer composed of a signal cable and a power supply cable having limited maximum permissible current, comprising:

a first interface terminal having a signal cable;

a second interface terminal;

a first switch connected to a power supply cable of said first interface terminal;

a second switch connected between a power supply cable of said second interface terminal and said first switch;

power supply voltage detection means connected to the power supply cable of said first interface terminal or the power supply cable of said second interface terminal to output a control signal in response to the fact that a voltage of said power supply cable has reached a predetermined voltage or more;

a third switch on which an ON/OFF-control is performed by an output terminal of said power supply voltage detection means, and which performs an ON/OFF-control on said first and second switches using a voltage of the power supply cable to which said power supply voltage detection means is not connected out of the power supply cable of said first interface terminal and the power supply cable of said second interface terminal; and a main unit connected to the signal cable of said first interface terminal and output terminals of said first and second switches.

2. An electronic device including an interface for data transfer composed of a signal cable and a power supply cable having limited maximum permissible current, comprising:

a first interface terminal having a signal cable;

a second interface terminal;

a first switch connected to a power supply cable of a positive electrode of said first interface terminal;

a second switch connected between a power supply cable of a positive electrode of said second interface terminal and said first switch, so that a cable connecting to said first switch becomes a power supply cable of the device;

power supply voltage detection means connected to the power supply cable of the positive electrode of said second interface to output a control signal in response to the fact that a voltage of the power supply cable of said positive electrode has reached a predetermined voltage or more;

a third switch on which an ON/OFF-control is performed by an output terminal of said power supply voltage detection means, and which performs an ON/OFF-control on said first and second switches using a voltage of the power supply cable of said first interface terminal;

a fourth switch connected to said first switch, said third switch and a power supply cable of a negative electrode of said second interface terminal;

a fifth switch connected to said second switch, said third switch and the power supply cable of the negative electrode of said second interface terminal; and a main unit connected to the signal cable of said first interface terminal and also to output terminals of said first and second switches.

* * * * *

UNITED STATES PATENT AND TRADEMARK OFFICE
CERTIFICATE OF CORRECTION

PATENT NO. : 7,329,969 B2 Page 1 of 1
APPLICATION NO. : 10/961836
DATED : February 12, 2008
INVENTOR(S) : S. Niinuma It is certified that error appears in the above-identified patent and that said Letters Patent is hereby corrected as shown below:

| COLUMN | LINE | ERROR |
|---|---|---|
| (*) Title Page 1, col. 1 | Notice | delete "This patent is subject to a terminal disclaimer." |

Signed and Sealed this

Fourteenth Day of April, 2009

JOHN DOLL
*Acting Director of the United States Patent and Trademark Office*